(12) United States Patent  (10) Patent No.: US 8,753,013 B2
Sato et al.  (45) Date of Patent: Jun. 17, 2014

(54) SELF-STANDING BAG AND MANUFACTURING METHOD THEREOF

(75) Inventors: Masaaki Sato, Yokohama (JP); Masakazu Sato, Yokohama (JP)

(73) Assignee: Oshio Industry Co., Ltd. (JP)

( * ) Notice: Subject to any disclaimer, the term of this patent is extended or adjusted under 35 U.S.C. 154(b) by 0 days.

(21) Appl. No.: 13/482,747

(22) Filed: May 29, 2012

(65) Prior Publication Data

US 2012/0237143 A1 Sep. 20, 2012

Related U.S. Application Data

(63) Continuation of application No. 11/509,499, filed on Aug. 24, 2006, now Pat. No. 8,206,033.

(30) Foreign Application Priority Data

Aug. 24, 2005 (JP) .................................. 2005-243237

(51) Int. Cl.
B65D 30/16 (2006.01)
B65D 33/02 (2006.01)

(52) U.S. Cl.
USPC ............................ 383/104; 383/119; 383/906

(58) Field of Classification Search
USPC .................. 383/104, 119, 906, 107, 122, 120
See application file for complete search history.

(56) References Cited

U.S. PATENT DOCUMENTS 8,206,033 B2 * 6/2012 Sato et al. ..................... 383/104
2005/0053314 A1 3/2005 Ikeda et al.

FOREIGN PATENT DOCUMENTS

| JP | 58-171845 | 11/1983 | |
| JP | 63-158848 | 10/1988 | |
| JP | 2002136573 A * | 5/2002 | ................ A61J 1/10 |
| JP | 2003-191964 | 9/2003 | |
| JP | 2003285348 A * | 10/2003 | ............. B29C 45/14 |
| JP | 2005-162301 | 6/2005 | |
| JP | 2005170396 A * | 6/2005 | ............. B65D 30/16 |
| WO | WO2005/063589 A1 | 7/2005 | |

* cited by examiner

Primary Examiner — Jes F Pascua
(74) Attorney, Agent, or Firm — Berliner & Associates

(57) ABSTRACT

The self-standing bag comprises a package for accommodating a content, a port provided in the center of the top portion of the package, and reinforcing members formed of a thermoplastic resin which cover the outer faces of both side edges of the package. The lower end portion of the reinforcing member is located above the bottom edge of the package. The lower end portion of the reinforcing member is projected inward of a lower cutout.

6 Claims, 9 Drawing Sheets

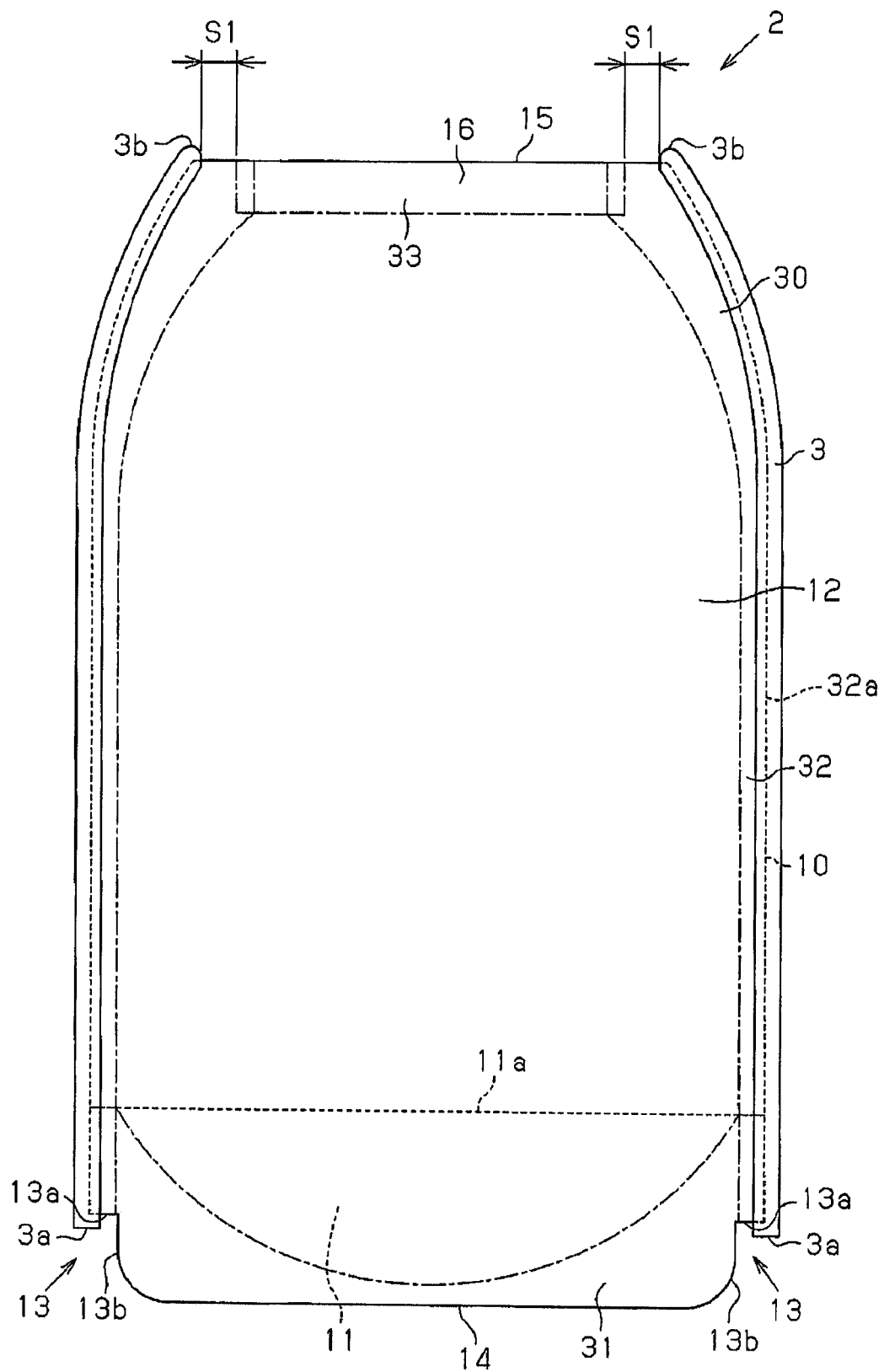

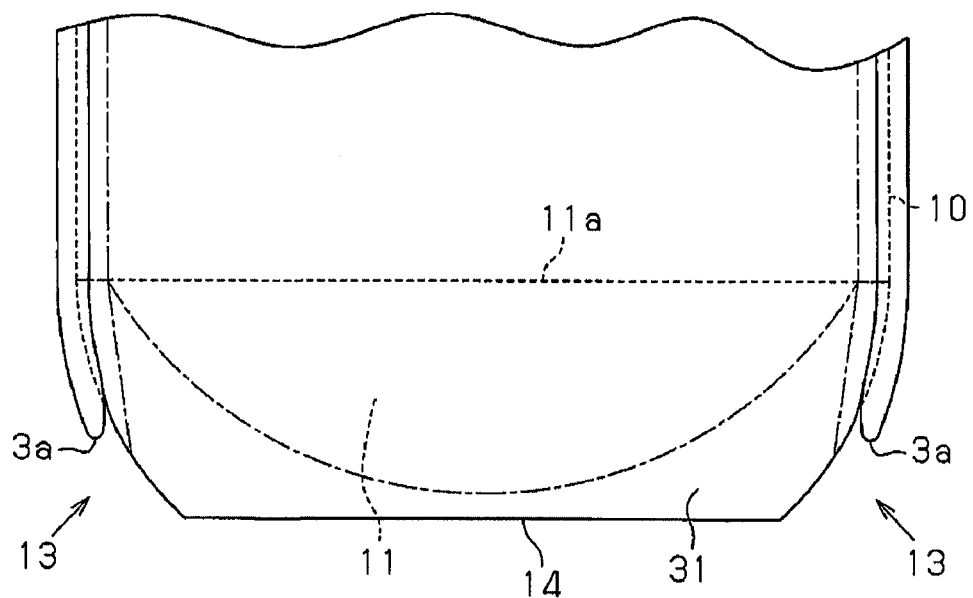
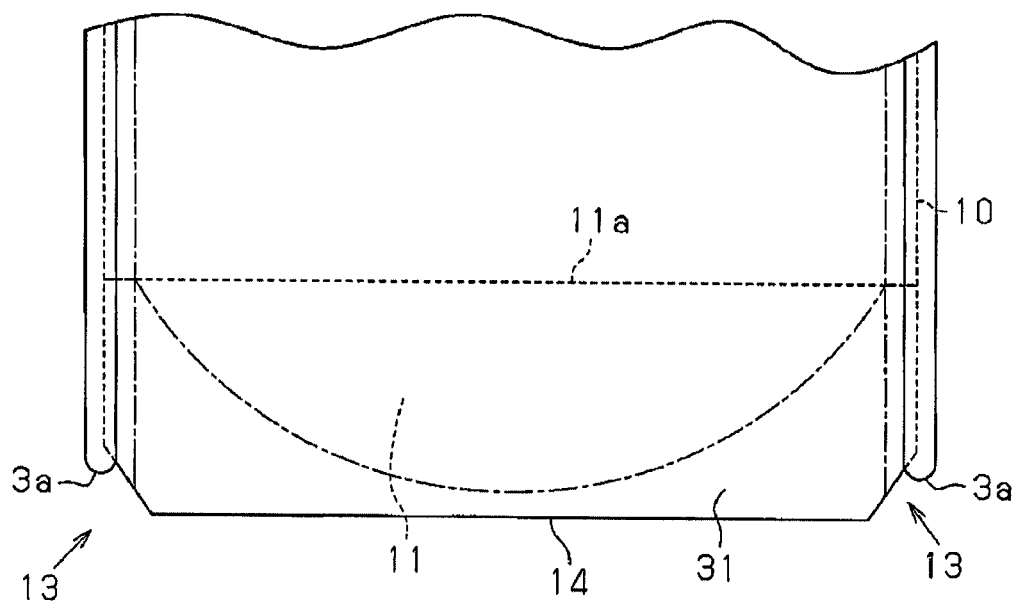

SELF-STANDING BAG AND MANUFACTURING METHOD THEREOF

CROSS-REFERENCE TO RELATED APPLICATIONS

This application is a continuation of prior application U.S. application Ser. No. 11/509,499 filed on Aug. 24, 2006, now U.S. Pat. No. 8,206,033, which is incorporated herein by reference in its entirety for all purposes.

BACKGROUND OF THE INVENTION

The present invention relates to a self-standing bag having a reinforcing material and manufacturing method thereof.

Japanese Laid-Open Patent Publication No. 2003-191964 has disclosed a self-standing bag in which both side edges and top edge of a package are covered with thermoplastic resin reinforcing material. In the self-standing bag described, the reinforcing material functions as a supporting pillar of the package. Thus, the self-standing bag is prevented from bending at its central portion or falling down even if the quantity of content charged in the self-standing bag is small.

In the self-standing bag, the bottom end of the reinforcing material is projected downward from the bottom edge of the package. Consequently, the bottom end of the reinforcing material makes contact with a placement surface so that the entire bottom edge of the self-standing bag does not make contact with the placement surface thereby allowing the self-standing bag to stand itself in a stable condition.

SUMMARY OF THE INVENTION

An objective of the present invention is to provide a self-standing bag having a higher completeness which can stand itself in a stable manner.

One aspect of the present invention is a self-standing bag. The self-standing bag comprises a package for accommodating a content, a port provided on a top of the package, and a reinforcing member for covering an outer face on a side edge of the package. The reinforcing member is formed of a thermoplastic resin and a lower end of the reinforcing member is located on the same position as a bottom edge of the package or above the bottom edge.

Another aspect of the present invention is a manufacturing method of self-standing bag. The self-standing bag comprises a package for accommodating a content, a port provided on a top of the package, and a reinforcing member for covering an outer face on a side edge of the package. The reinforcing member is formed of a thermoplastic resin. A lower end portion of the side edge of the package has a lower cutout and a lower end of the reinforcing member is projected inward of the lower cutout. The manufacturing method comprises a step of forming the package, a step of mounting the package in a first mold by disposing the side edges of the package in a first concave portion of the first mold, a step of, after the package is mounted in the first mold, bringing the first mold and a second mold into contact with each other with the bottom end of the side edge of the package kept not in contact with the first mold and the second mold due to provision of a cavity defined by a first concave portion of the first mold and a second concave portion of the second mold, a step of forming the reinforcing member so as to cover the side edge of the package by injecting thermoplastic resin into the cavity, and a step of attaching the port on the top of the package.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a front view showing a self-standing bag of a modification;

FIG. 7 is a partial front view of a self-standing bag of a modification;

FIG. 8 is a partial front view of a self-standing bag of a modification;

DETAILED DESCRIPTION OF THE PREFERRED EMBODIMENTS

Hereinafter, a self-standing bag according to an embodiment of the present invention will be described with reference to FIGS. 1 to 3.

First, the structure of a self-standing bag 1 will be described with reference to FIGS. 1 to 3.

Figure 3:
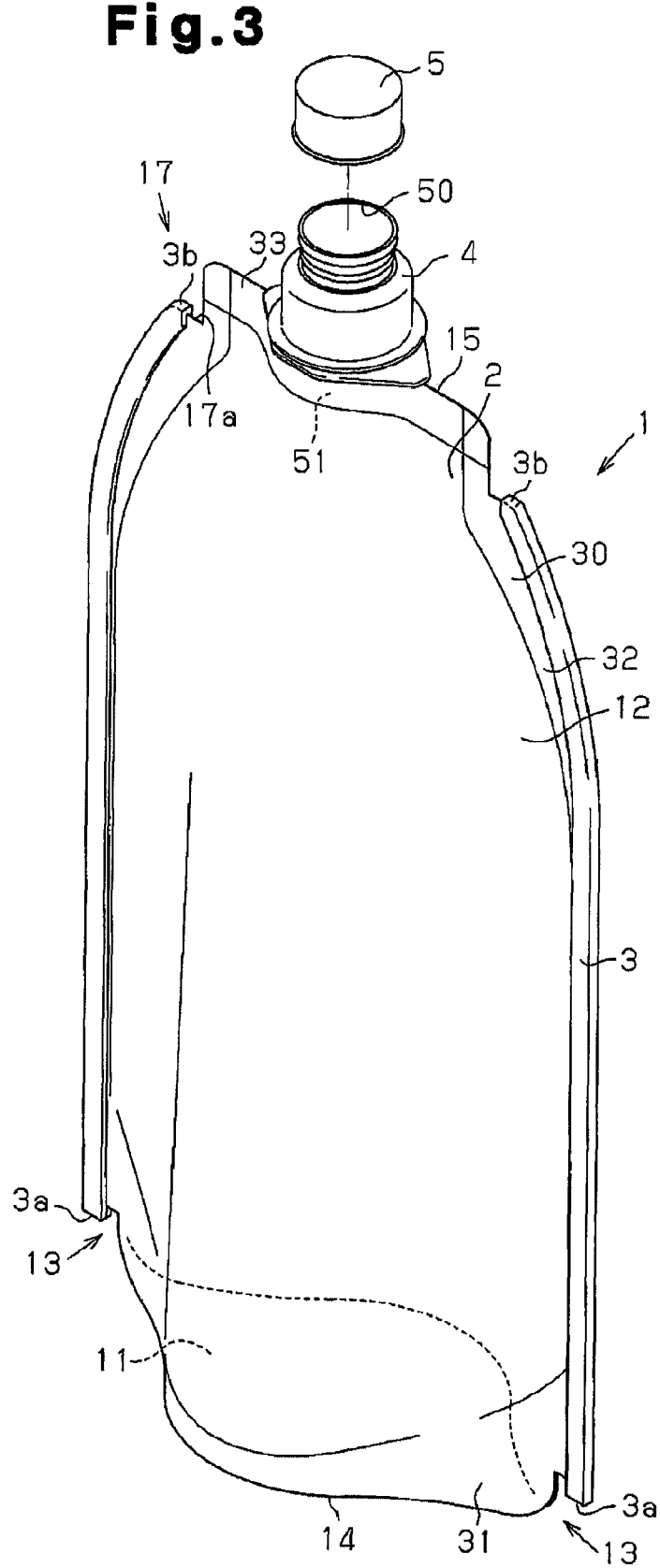
FIG. 3 is a perspective view showing the self-standing bag of the embodiment.

As shown in FIG. 3, the self-standing bag 1 comprises a package 2 for accommodating a content, two reinforcing members 3 which cover both edges 10 of the package 2 and a spout 4 having a port for taking out the content. The content of the package 2 in the self-standing bag 1 is taken out through the spout 4.

Figure 1:
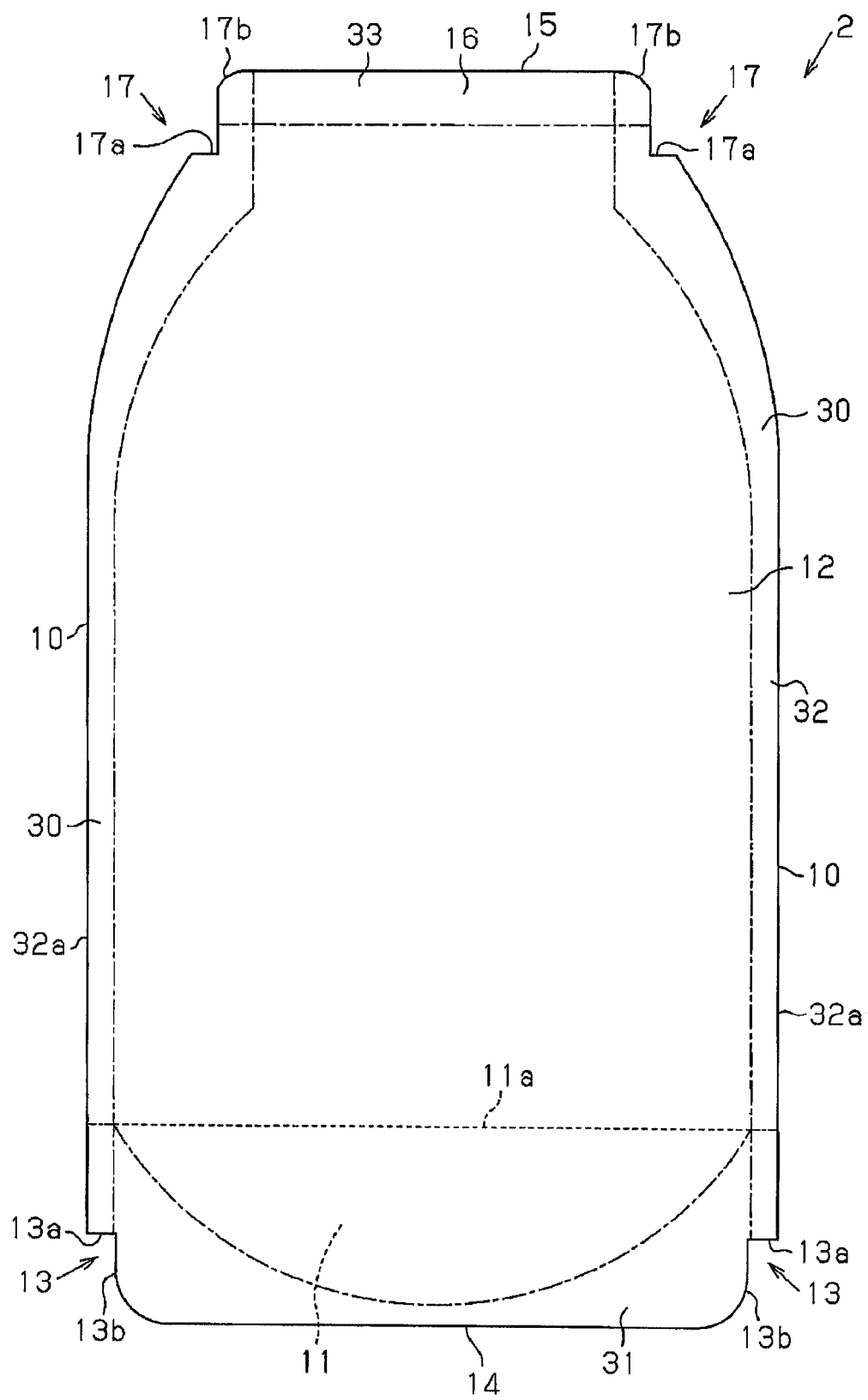
FIG. 1 is a front view showing a package of an embodiment.

As shown in FIG. 1, the package 2 is formed by a bottom face sheet 11 and a pair of side face sheets 12, and the bottom face sheet 11 is disposed between both the side face sheets 12 and then, the respective sheets are fused together with heat. Fused portions 30 are formed on the outer periphery of the package 2 by the thermal fusion. The bottom face sheet 11 on the bottom portion of the package 2 is folded in two along a bending line 11a such that the folded pieces face inward (upward in FIG. 1).

A lower cutout 13 is formed at the bottom end of each side edge 10 of the package 2 by cutting part of the bottom face sheet 11 and the side face sheet 12. Each lower cutout 13 has a lower cutout face 13a and a corner face 13b. The lower cutout face 13a extends in a direction perpendicular to the side edge 10 of the package 2 and the corner face 13b extends along an arc from the lower cutout face 13a to the bottom edge 14 of the package 2. That is, the lower cutout faces 13a are disposed above the bottom edge 14 of the package 2.

Although the bottom face sheet 11 and the respective side face sheets 12 are fused with heat on arc-like corner faces 13b, the both side face sheets 12 are not fused together with heat.

Thus, when the package 2 is filled with a content, the corner faces 13b of the lower cutouts 13 are opened by the weight of the self-standing bag 1. At this time, the corner faces 13b of the lower cutouts 13 are not projected downward of the bottom edge 14 of the package 2. Thus, the entire bottom edge 14 of the package 2 makes an equal contact with a flat placement surface. Accordingly, the self-standing bag can stand up stably.

The sheet width of each side face sheet 12 decreases gradually as it goes upward of the side face sheet 12. The top end portion of both the side edges 10 of the side face sheet 12 has a smooth curve line. An upper cutout 17 is formed at the top end of each side edge 10 of the package 2 by cutting out part of the both side face sheets 12. Each upper cutout 17 has an upper cutout face 17a and a corner face 17b. The upper cutout face 17a extends in a direction perpendicular to the side edge 10 of the package 2 and the corner face 17b extends along an arc from the upper cutout face 17a to the top edge 15 of the package 2. That is, the upper cutout faces 17a are disposed below the top edge 15 of the package 2. An opening 16 is formed in a portion in which the both side face sheets 12 are not bonded together on the top edge 15 of the package 2.

The base material of the bottom face sheet 11 and the side face sheet 12 may be a plastic film having thermal adhesiveness on at least one side and a laminate film in which aluminum foil, paper or the like is overlaid on plastic film. The bottom face sheet 11 may be formed of the same base material as or a different base material from the side face sheet 12.

More specifically, a single-layer plastic film having thermal adhesiveness, a coextruded multilayer film containing resin layer having thermal adhesiveness on its outer layer, a laminate film in which metal foil such as aluminum foil, paper or various kinds of plastic films are overlaid on a resin layer having thermal adhesiveness may be used. As the resin layer or plastic film, preferably, a polyolefin base resin such as polyethylene, polypropylene having thermal adhesiveness and functioning as a sealant layer is used. As resin for intensifying the film itself, polyamide base resin such as nylon, polyester base resin such as polyethylene terephthalate, polyolefin base resin and the like may be used. As the reinforcing resin layer, preferably, uniaxially or biaxially stretched film is used from viewpoints of excellent strength and dimensional stability.

Although single-layer plastic films may be used as the bottom face sheet 11 and the side face sheet 12, it is preferable to use a film in which reinforcing resin layer is overlaid. Particularly, it is preferable to use a film in which thermal adhesive resin layer is overlaid on both faces thereof in that its inside face functions as a sealant layer and the outside face functions as a contact face with the reinforcing member 3. The bottom face sheet 11 has a thermal adhesive sealant layer on a side facing the side face sheet 12 when the bottom sheet is folded and a non-thermal adhesive stretched film on a side not facing the side face sheet 12.

The bottom face sheet 11 and the side face sheet 12 may be provided with a gas barrier layer in order to add a function of blocking gas such as oxygen, water vapor, as required. The gas barrier layer is formed by coextruding, cording or laminating ethylene-vinyl alcohol copolymer (EVOH) layer or polyvinylidene chloride layer or evaporation coating metal or ceramic.

The thickness of the base material of the bottom face sheet 11 and the side face sheet 12 is preferred to be 20-900 μm. Although a thick base material is preferable from viewpoints of maintainability of shape and self-standing property, a thin base material is more preferable from viewpoints of plasticity, light weight, and resource saving. According to this embodiment, maintainability of shape and self-standing property are ensured despite the thin base material because the reinforcing members 3 are provided on both side portions of the self-standing bag 1. However, the thickness of the base material is preferred to be in a range of 100-200 μm from viewpoints of formability and handling performance.

As the fused portions 30, the package 2 has a bottom edge fused portion 31, a side edge fused portion 32 and a top edge fused portion 33. The bottom edge fused portion 31 is a fused portion between the bottom face sheet 11 and the bottom end portion of the respective side face sheets 12. The side edge fused portion 32 is a fused portion between both side edges of the respective side face sheets 12 and the top edge fused portion 33 is a fused portion between the top edges of the respective side face sheets 12. The bottom edge of the bottom edge fused portion 31 forms the bottom edge 14 of the package 2 (side face sheet 12). The width in the longitudinal direction of the bottom edge fused portion 31 is set to increase as it goes near each side edge 10 (each side edge fused portion 32) of the package 2. The top edge of the bottom edge fused portion 31 extends along an arc. The side edge fused portions 32 form the side edges 10 (side edges of both side face sheets 12) of the package 2. The width of the side edge fused portion 32 is set to increase as it goes upward of the side face sheet 12.

Figure 2:
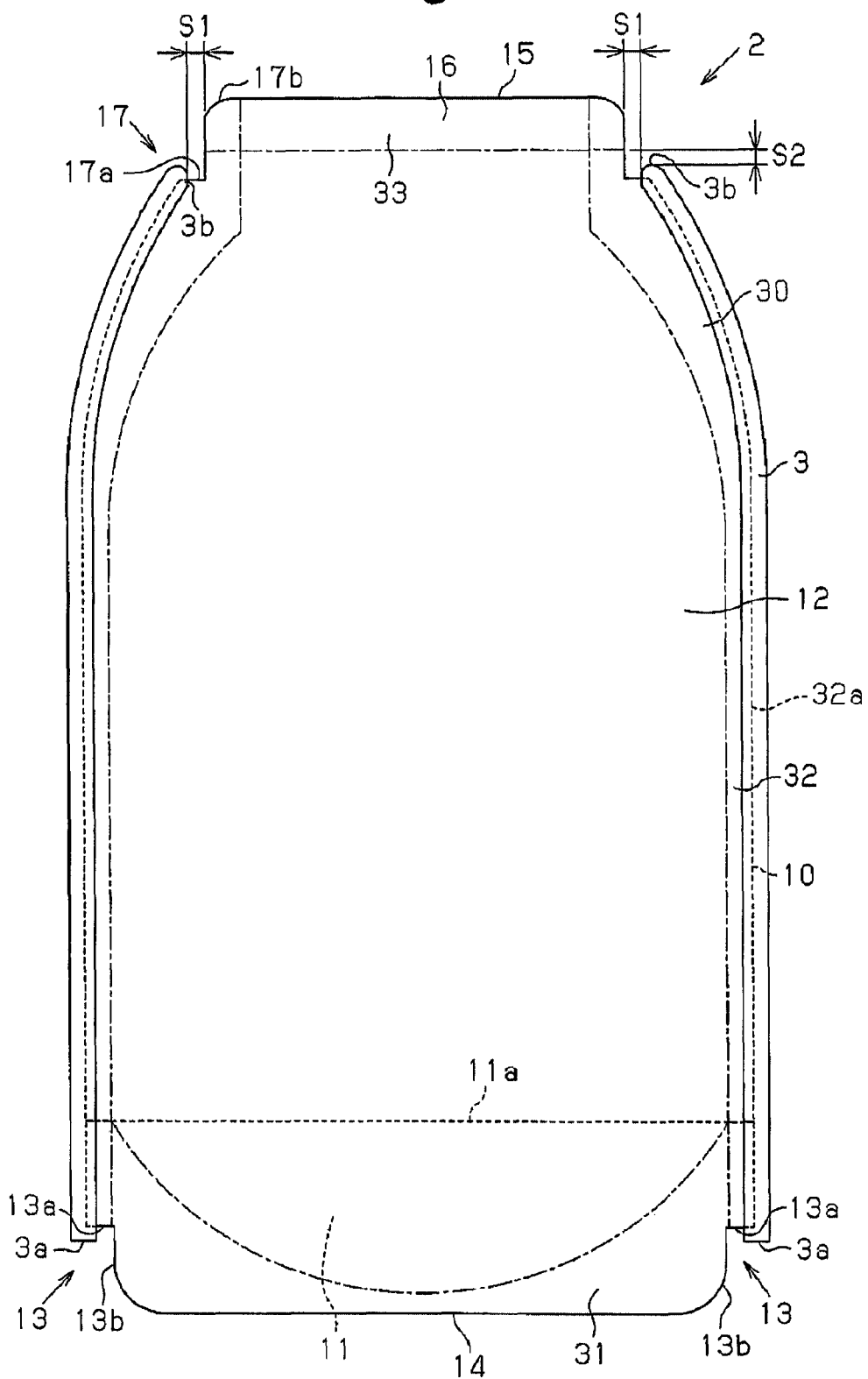
FIG. 2 is a front view showing a self-standing bag of the embodiment.

As shown in FIG. 2, the reinforcing member 3 is formed on both side edges 10 of the package 2 so as to cover the outer face of the side edge fused portions 32. The bottom end portion 3a of the reinforcing member 3 projects downward of the lower cutout faces 13a of the lower cutouts 13. The bottom end portions 3a of the reinforcing member 3 are each located between the lower cutout face 13a of the corresponding lower cutout 13 and the bottom edge 14 of the package 2.

The top end portion 3b of the reinforcing member 3 projects upward of the upper cutout faces 17a of the upper cutouts 17. The top end portion 3b of the reinforcing member 3 is located between the upper cutout faces 17a of the upper cutouts 17 and the top edge 15 of the package 2. The top end portion 3b of the reinforcing member 3 and the top edge fused portion 33 are disposed with gaps S1 therebetween in the horizontal direction. Further, the top end portion 3b of the reinforcing member 3 and the top edge fused portion 33 are disposed with a gap S2 in the longitudinal direction.

The thickness of the reinforcing member 3 is set in a range of 0.1-5.0 mm from viewpoints of maintainability of shape and self-standing property of the package 2. The thickness of the reinforcing member 3 is a dimension corresponding to the thickness direction of the both side face sheets 12. As material for forming the reinforcing member 3, resin which can be fused with resin layer (for example, sealant layer or resin layer on the outer surface) which constitutes the side face sheet 12. The resin layer of the side face sheet 12 is melted with heat of fused resin at the time of injection molding. Then, at least one of the side face 32a and the surface of the side edge fused portion 32 are fused together and bonded with the reinforcing member 3.

As the material which forms the reinforcing member 3, thermoplastic resins, for example, polyolefin base resin such as polyethylene, polypropylene, polyamide base resin such as nylon, polyester base resin such as polyethylene terephthalate or the like may be used. These thermoplastic resins have of thermal adhesiveness with the bottom face sheet 11 and the side face sheet 12. Particularly, if resin similar to or the same as the sealant layer of the side face sheet 12 or the thermoplastic resin on the outer surface is used, high bonding strength between the reinforcing member 3 and the side face sheet 12 is ensured.

As shown in FIG. 3, the spout 4 is provided in the center of the top portion of the package 2. The spout 4 has an opening 50. A cap 5 is attached to the top of the spout 4 for closing the opening 50. The cap 5 can be attached to or detached from the spout 4 by turning the cap 5 disposed on the top of the spout 4.

Preferably, the surface of the spout 4 is formed of a thermoplastic resin which can be fused together with the sealant layer of the side face sheet 12 in order to fuse the spout 4 to the package 2. As the material which forms the spout 4, polyethylene (PE), polypropylene (PP), ethylene-vinyl acetate copolymer (EVA), polyester such as polyethylene terephthalate (PET), polyamide such as nylon, cyclic polyolefin, or thermoplastic plastic such as polybutylene is used. The spout 4 may be formed of resin similar to or the same as the reinforcing member 3.

Figure 4:
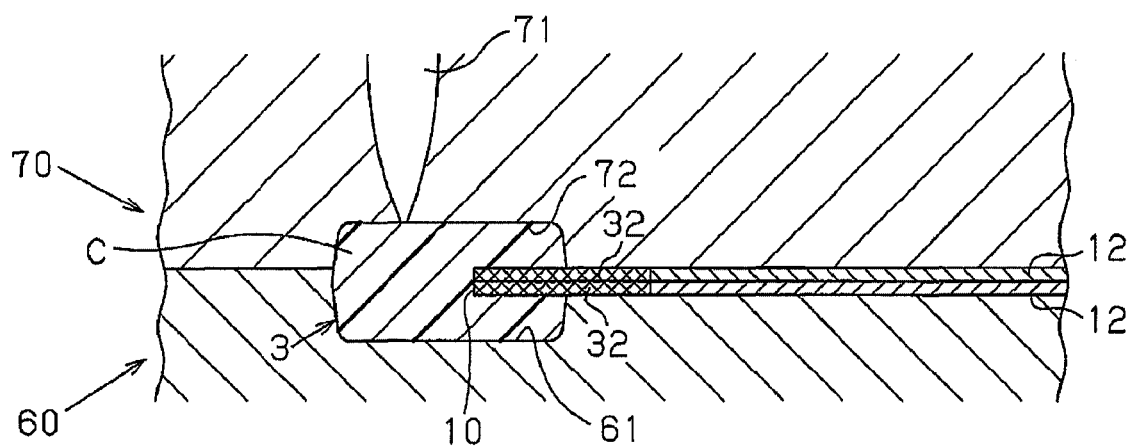
FIG. 4 is an explanatory diagram for explaining a method for forming a reinforcing material.

Next, manufacturing method of the self-standing bag 1 will be described with reference to FIGS. 1, 4 and 5.

First, the package 2 shown in FIG. 1 is formed. More specifically, the bottom face sheet 11 is folded in two along the bending line 11a such that its folded pieces face inward (upward in FIG. 1). Next, a pair of the side face sheets 12 are disposed such that they sandwich the folded bottom face sheet 11 and the respective sheets are fused thermally and bonded using a bonding machine (sealing machine). Then, the fused portions (bottom edge fused portion 31 and side edge fused portion 32) between the bottom face sheet 11 and the side face sheets 12 are cut into a predetermined shape so as to form the package 2. The lower cutouts 13 and the upper cutouts 17 may be formed when the fused portions are cut. Prior to fusing thermally of the respective sheets, the bottom face sheet 11 and the side face sheets 12 may be formed preliminarily.

Next, the package 2 is set in a mold and the reinforcing member 3 is formed on both side edges 10 of the package 2 by injection molding. More specifically, as shown in FIG. 4, the side edge 10 of the package 2 is disposed in a first concave portion 61 in a first mold 60 and the package 2 is set in the first mold 60. Next, a second mold 70 is mated with the first mold 60. At this time, a cavity C is defined between a second concave portion 72 in the second mold 70 and the first concave portion 61 in the first mold 60. Neither the first mold 60 nor the second mold 70 makes contact with the side edge 10 of the package 2 at both ends in the length direction of the cavity C. Then, the cavity C is evacuated and molten resin is injected into the cavity C from a charging port 71 provided in the second mold 70 so as to solidify the resin and form the reinforcing member 3 on both the side edges 10 of the package 2. Although the charging port 71 is formed above the cavity C, it may be formed sideway of the cavity C.

Figure 5A:
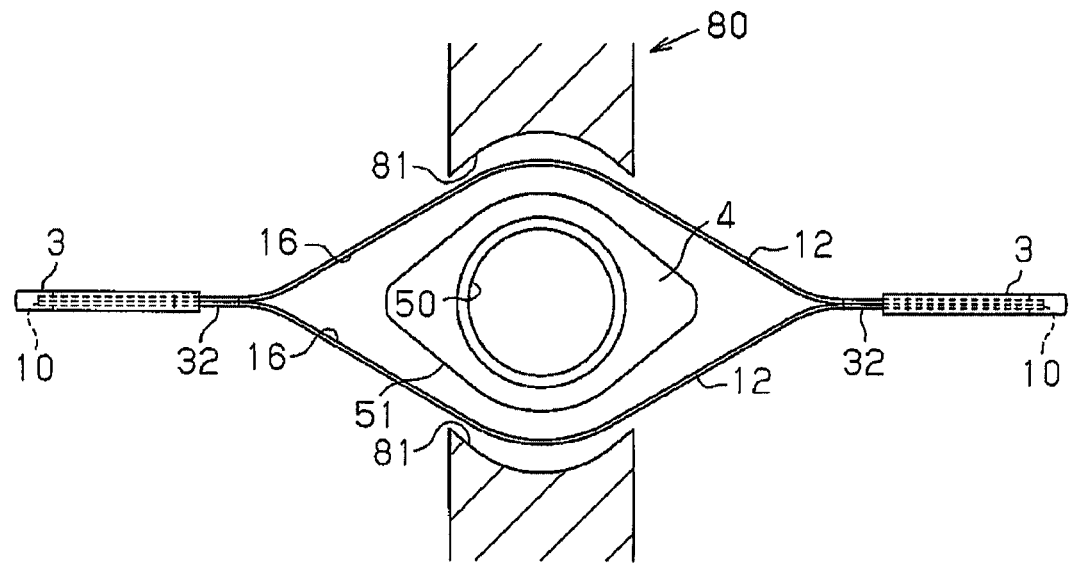
FIG. 5(A) is an explanatory diagram for explaining a method for attaching a spout to the self-standing bag.
Figure 5B:
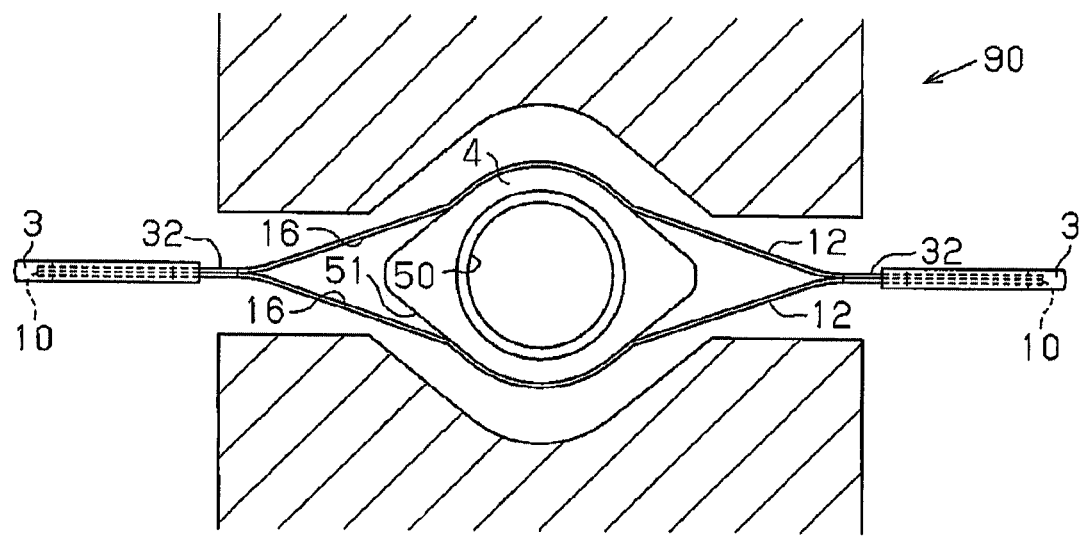
FIG. 5(B) is an explanatory diagram for explaining a method for attaching a spout to the self-standing bag.

Finally, as shown in FIGS. 5(A) and 5(B), the spout 4 is attached to the center of the top of the package 2. More specifically, the package 2 is set in a holder or chuck of the charging machine. Next, the opening portion 16 of the package 2 is opened and a nozzle is inserted into the opening portion 16 and the package 2 is charged with content. Then, the spout 4 is disposed in the opening portion 16 using a part feeder or the like and the spout 4 is fused to the opening portion 16 of the package 2 with heat. Usually, the contact surface of a sealing mold or cooling mold of the charging machine is plane. However, to fuse the spout 4 to the package 2 with heat, a first sealing mold 80 having concave portions 81 of substantially the same shape as a base portion 51 of the spout 4 may be used as shown in FIG. 5(A). In this case, it is advantageous to charge the self-standing bag 1 with the content before attaching the spout 4 from viewpoints of ease of charging with the content and ease of transportation of a product.

Upon fusing the spout 4, the first sealing mold 80 having a small width is used to fuse only part of the spout 4 with heat. The base portion 51 of the spout 4 is bonded to the opening portion 16 of the package 2 by first thermal fusion carried out first. Next, a second sealing mold 90 having a larger width than the first sealing mold 80 is used as shown in FIG. 5(B). Non-fused portions of the both side face sheets 12 are fused together by second thermal fusion carried out next and the base portion 51 is heated and pressurized again. The length of a portion corresponding to the opening portion 16 in the second sealing mold 90 may be of a dimension which allows the entire periphery of the opening portion 16 to be sealed with the spout 4 inserted. The above-described method is advantageous in that air can be discharged from the package 2 filled with the content because there exists the opening between the both side face sheets 12 after the first thermal fusion is carried out. It is preferable to cool the both side face sheets 12 promptly using the cooling mold in order to prevent deformation of the both side face sheets 12 due to thermal contraction.

The top edge fused portion 33 is formed along the top edge 15 of the package 2 to seal the opening portion 16 by fusing the top edge of the both side face sheets 12 with heat with the second sealing mold 90 (see FIGS. 2, 3). Both end portions of the top edge fused portion 33 overlaps the top end portion of each side edge fused portion 32. Consequently, a sufficient sealing performance is ensured in the vicinity of both ends of the opening portion 16.

In the self-standing bag 1 formed in this way, the bottom face sheet 11 is expanded from a condition in which it is folded in two as shown in FIG. 3 and at the same time, the bottom portion of the package 2 is expanded. As a consequence, the self-standing bag 1 maintaining the plasticity of the package 2 and an excellent self-standing property can be achieved. The kind of the content to be charged in the package 2 is not restricted to any particular one but fluid substance such as liquid, adhesive fluid, powder, small diameter grains is preferable. The spout 4 with a cap 5 is provided at the top of the package 2. Thus, a content left after the self-standing bag 1 is opened can be stored for a while. An emptied self-standing bag 1 can be folded back or rounded to reduce its volume. Thus, the self-standing bag 1 having an excellent disposability and preferable for environmental protection can be achieved. Because the reinforcing member 3 is formed on the both side edges 10 of the package 2, the maintainability of shape and self-standing property are improved thereby blocking the self-standing bag 1 from being folded substantially in the center. Thus, the content can be poured out easily by inclining the self-standing bag 1 even if the quantity of left content is small and the self-standing property of the self-standing bag 1 is ensured, so that leakage of the content is suppressed.

This embodiment secures following advantages.

(1) The reinforcing member 3 is formed on both side edges of the package 2. The bottom end portion 3a of the reinforcing member 3 is disposed above the bottom edge 14 of the package 2. In this case, the self-standing bag 1 can stand entirely more stably by the entire bottom edge 14 of the package 2 because the bottom end of the reinforcing member 3 does not make contact with the placement surface. That is, a posture of the self-standing bag 1 in a standing condition can be kept excellently.

(2) The lower cutouts 13 are provided at the bottom end of the side edge 10 of the package 2. The bottom end portion 3a of the reinforcing member 3 is located between the lower cutout faces 13a of the lower cutouts 13 and the bottom edge 14 of the package 2. Under the same structure, the bottom end portion of the side edge 10 of the package 2 is never sandwiched by the first and second molds 60, 70 at the time of injection molding of the reinforcing member 3. That is, because the first and second molds 60, 70 make direct contact with each other in the vicinity of the bottom end portion 3a of the reinforcing member 3, leakage of resin injected into the cavity C can be avoided. Accordingly, generation of burr at the time of injection molding can be suppressed as much as possible. Thus, drop of manufacturing efficiency due to removal of the burr can be avoided.

(3) The upper cutouts 17 are provided at the top ends of both the side edges 10 of the package 2. In this case also, the top end portions of the side edges 10 of the package 2 are never sandwiched by the first and second molds 60, 70 at the time of injection molding of the reinforcing member 3. That is, because the first and second molds 60, 70 make direct contact with each other in the vicinity of the top end portion 3b of the reinforcing member 3, leakage of resin injected into the cavity C can be avoided. Thus, generation of burr at the time of injection molding can be prevented as much as possible. Therefore, drop of manufacturing efficiency due to removal of the burr can be avoided.

(4) After the reinforcing member 3 is formed on the package 2 and the package 2 is charged with a content, the spout 4 is attached to the self-standing bag 1. In this case, the content can be charged in the package 2 quickly by widening the opening portion 16 of the package 2. The package 2 and the spout 4 can be controlled separately different from a method of attaching the spout 4 to the package 2 prior to charging of the content, which is advantageous for storage and transportation.

(5) The top end portion 3b of the reinforcing member 3 is projected upward of the upper cutout faces 17a of the upper cutouts 17 and disposed with a gap S1 and a gap S2 from the opening portion 16 of the package 2. Consequently, the reinforcing member 3 is never an obstacle to charging of the content into the package 2. Further, the spout 4 can be attached easily to the package 2 even after the content is charged. Accordingly, the content can be charged into the package 2 easily at any timing before or after forming of the top edge fused portion 33.

(6) The inner edge of the side edge fused portion 32 is not covered with the reinforcing member 3 in the vicinity of the top edge 15 of the package 2. The second sealing mold 90 for sealing the opening portion 16 seals a specified portion in the vicinity of the opening portion 16 of the top edge 15 of the package 2. Thus, a contact between the second sealing mold 90 and the reinforcing member 3 is avoided when the opening 16 at the top edge 15 of the package 2 is sealed.

In the meantime, this embodiment may be modified as follows.

As a method for bonding the respective sheets, for example, bonding with adhesive agent, bonding with ultrasonic wave, bonding with high frequency or the like may be used as well as the thermal fusion. Further, the package 2 may be formed of an arbitrary number of sheets.

Although according to this embodiment, the width of the bottom edge fused portion 31 is increased as it goes nearer each side edge fused portion 32, the width in the vicinity of each side edge fused portion 32 may be constant. Further, although the width of the side edge fused portion 32 is increased as it goes upward along the side face sheet 12, the width may be always constant.

In the illustrated embodiment, as long as the top edge fused portion 33 partially overlaps the top end portion of the side edge fused portion 32, the position of the top end of the side edge fused portion 32 may be set lower than the top edge 15 of the package 2. As long as the spout 4 can be fused to the package 2, a portion in the vicinity of the top edge of the side edge fused portion 32 may be set wide.

In the illustrated embodiment, it is permissible to form the reinforcing member 3 with a U-shaped section and attach the reinforcing member 3 such that it sandwiches the side edge fused portion 32 to physically connect the reinforcing member 3 with the package 2. Further, the reinforcing member 3 may be joined with the package 2 with adhesive agent.

In the illustrated embodiment, attachment of the spout 4 to the package 2 and formation of the top edge fused portion 33 may be carried out by a single thermal fusion. Timing of attaching the spout 4 to the package 2 may be before or after the package 2 is charged with the content.

In the illustrated embodiment, after the package 2 is charged with the content, it is permissible to seal the opening portion 16 by fusing the top edge 15 of the side face sheet 12 with heat. Further, a one-piece type spout 4 integrated with the cap 5 may be used at the opening 50.

In the illustrated embodiment, the cutout in the side edge 10 of the package 2 may be omitted. In this case, as shown in FIG. 6, the top end portion 3b of the reinforcing member 3 is located above the top edge 15 of the package 2 and disposed with a gap S1 in the lateral direction to the top edge fused portion 33. In this case, the length of the second sealing mold 90 for joining (sealing) the opening portion 16 entirely when the spout 4 is attached to the package 2 is set to more than a length stretching between the side edge fused portions 32 on both sides.

If the length of the second sealing mold 90 is shorter than a distance between the both reinforcing members 3, preferably, self-standing bag 1 is applied to a large self-standing bag 1 having a capacity of 1 liter or more. In this case, the positioning accuracy of the self-standing bag to the second sealing mold 90 is relaxed because gaps between both ends of the second sealing mold 90 and the both reinforcing members 3 are ensured sufficiently, so that continuous mounting operation of the spout 4 with a charging machine can be carried out stably. When manufacturing various kinds of packages with a different size, the second sealing mold 90 may be replaced with a mold having an appropriate length depending on the distance between the reinforcing members 3 for both ends of the second sealing mold 90 not to be located outside the package 2. On the other hand, a small second sealing mold 90 may be applied to a small package of less than 1 liter in its capacity.

In the illustrated embodiment, the shape of each lower cutout 13 may be changed as shown in FIGS. 7, 8. The shape of each lower cutout 13 may be circular as shown in FIG. 7 or tapered as shown in FIG. 8. That is, the bottom end portion 3a of the reinforcing member 3 needs to be below the bottom end portion of the side edge 10 of the package 2 and the shape of each lower cutout 13 is not restricted to any particular one. Likewise, the shape of each upper cutout 17 may be circular or tapered.

Figure 9:
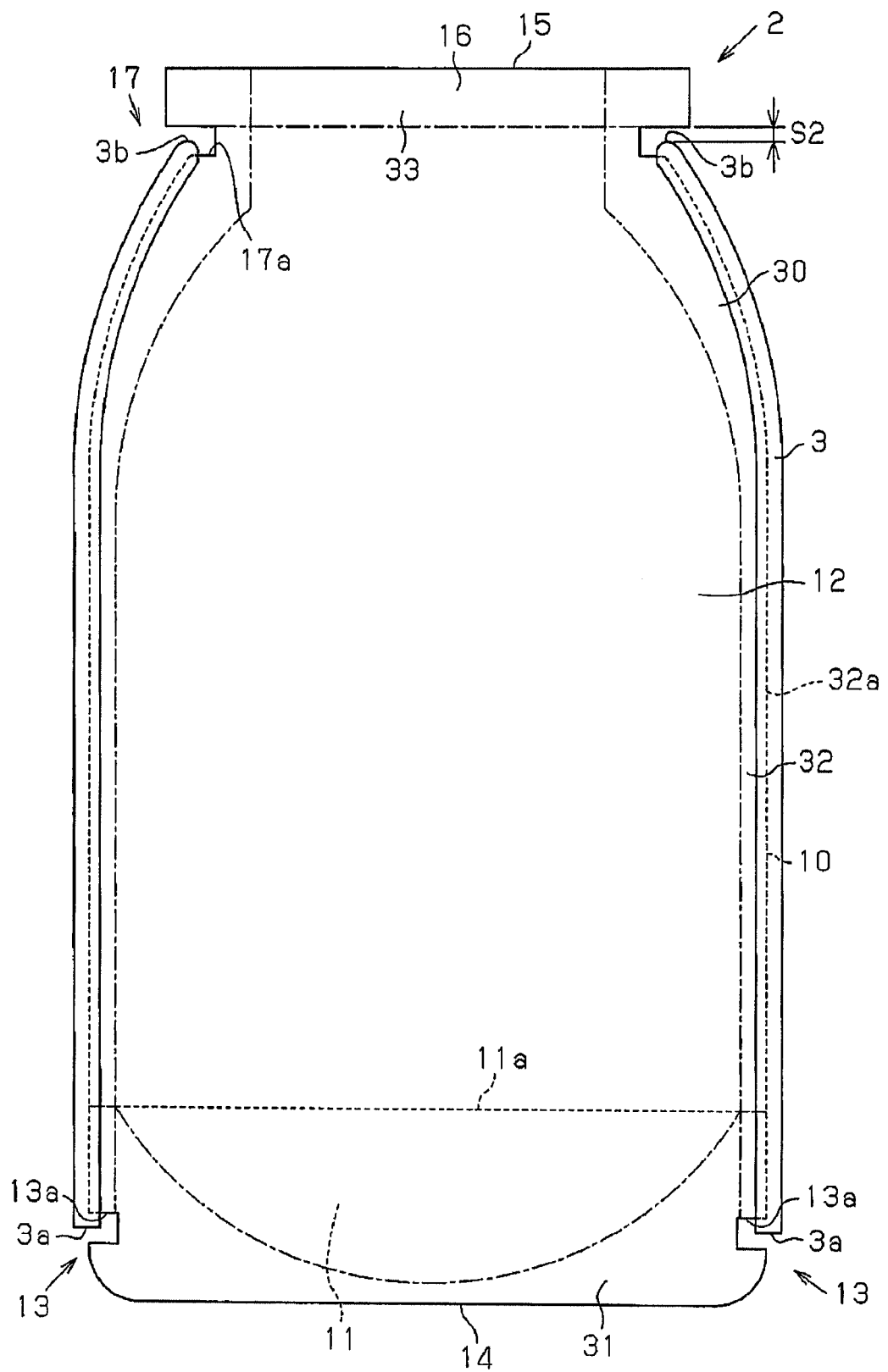
FIG. 9 is a front view of a self-standing bag of a modification.

In the illustrated embodiment, the positions of the lower cutouts 13 may be changed to above the bottommost end of the side edge 10 of the package 2. Likewise, the positions of the upper cutouts 17 may be changed to below the topmost end of the side edge 10 of the package 2. For example, as shown in FIG. 9, the top end portion 3b of the reinforcing member 3 and the top edge fused portion 33 are disposed with a gap S2 in the vertical direction.

Although in the illustrated embodiment, the reinforcing member 3 is an integrated object, it may be formed of a plurality of the reinforcing members 3. In this case, the quantities of the upper cutouts 17 and lower cutouts 13 may be changed corresponding to the quantity of the reinforcing members 3. Although the top end portion 3b of the reinforcing member 3 is smoothly curved, for example, a straight reinforcing member 3 may be used corresponding to the shape of the side face sheet 12.

Although in the illustrated embodiment, the lower cutouts 13 and the upper cutouts 17 have circular corner faces 13b, 17b, the shapes of the corner faces 13b, 17b may be changed to right angle.

Figure 10:
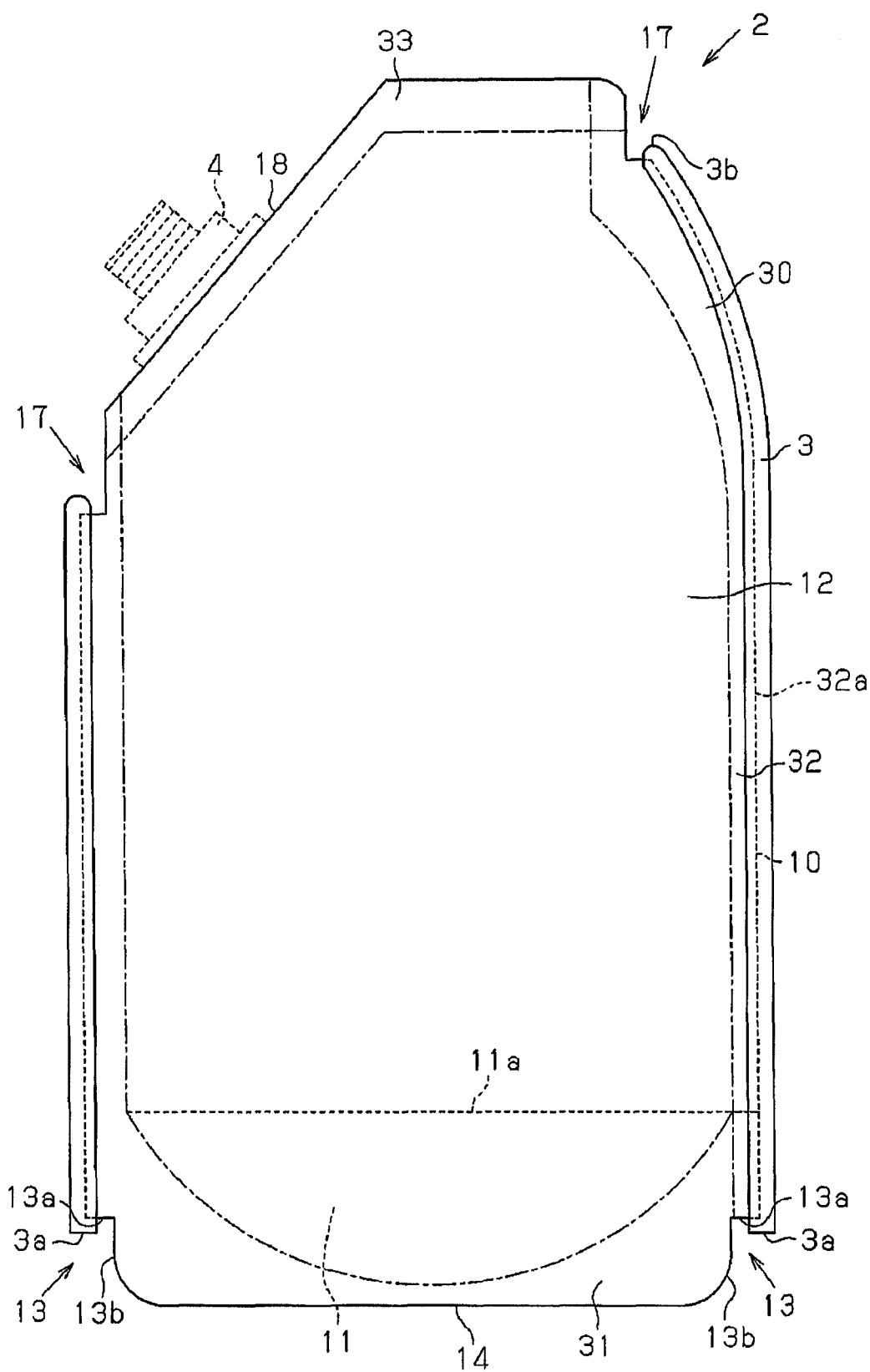
FIG. 10 is a front view of a self-standing bag of a modification.

In the illustrated embodiment, the attachment position of the spout 4 to the package 2 may be changed appropriately. For example, it is permissible to form an inclined edge 18 on a corner portion of the package 2 and attach the spout 4 to this inclined edge 18 as shown in FIG. 10.

In the illustrated embodiment, the bottom end portion 3a of the reinforcing member 3 is allowed not to be projected below the lower cutout face 13a of the lower cutouts 13. The top end portion 3b of the reinforcing member 3 is allowed not to be projected above the upper cutout faces 17a of the upper cutouts 17.

In the illustrated embodiment, the position of the bottom end portion 3a of the reinforcing member 3 may be changed to the same position as the bottom edge 14 of the package 2. Further, the position of the top end portion 3b of the reinforcing member 3 may be changed to the same position as the top edge 15 of the package 2.

The invention claimed is:

1. A self-standing bag comprising:
  a package for accommodating a content;
  a port provided on a top of the package; and
  a reinforcing member for covering an outer face on a side edge of the package,
  wherein the reinforcing member is formed of a thermoplastic resin,
  wherein the reinforcing member is formed by injection molding, and is formed to have a U-shape cross-section such that the outer face on the side edge of the package is sandwiched from the both sides by the reinforcing member,
  wherein the lower end portion of the side edge of the package has a lower cutout,
  wherein the upper end portion of the side edge of the package has an upper cutout including an upper cutout face,
  wherein the bottom end of the reinforcing member is located above the bottom edge of the package,
  wherein the top end of the reinforcing member is located above the upper cutout face, and
  wherein the lower cutout and the upper cutout pass through the package in a thickness direction of the package.

2. The self-standing bag according to claim 1, wherein the package is formed into a bag shape by bonding edges of a plurality of sheets to each other.

3. The self-standing bag according to claim 2, wherein a bond portion having a width is formed in an edge of the package.

4. The self-standing bag according to claim 3, wherein the reinforcing member is formed so as to cover an outer portion of the bond portion arranged in a side edge of the package.

5. The self-standing bag according to claim 4, wherein the reinforcing member is formed in such a manner as to expose an inner portion of the bond portion arranged in the side edge of the package.

6. The self-standing bag according to claim 1, wherein a thermal adhesive resin layer is overlaid on each of both faces of a sheet forming the package.

\* \* \* \* \*